(12) United States Patent
Ranstad et al.

(10) Patent No.: US 9,899,831 B2
(45) Date of Patent: Feb. 20, 2018

(54) METHOD AND DEVICE TO PROTECT AN ESP POWER SUPPLY FROM TRANSIENT OVER-VOLTAGES ON THE POWER GRID

(75) Inventors: Per Ranstad, Växjö (SE); Jörgen Linner, Växjö (SE)

(73) Assignee: General Electric Technology GmbH, Baden (CH)

(*) Notice: Subject to any disclaimer, the term of this patent is extended or adjusted under 35 U.S.C. 154(b) by 75 days.

(21) Appl. No.: 13/878,291

(22) PCT Filed: Sep. 30, 2011

(86) PCT No.: PCT/EP2011/067061
§ 371 (c)(1),
(2), (4) Date: Jul. 8, 2013

(87) PCT Pub. No.: WO2012/045666
PCT Pub. Date: Apr. 12, 2012

(65) Prior Publication Data
US 2013/0321959 A1 Dec. 5, 2013

(30) Foreign Application Priority Data

Oct. 6, 2010 (EP) .................................. 10186733

(51) Int. Cl.
*H02H 9/04* (2006.01)
*H02H 7/12* (2006.01)
(Continued)

(52) U.S. Cl.
CPC ............ *H02H 9/04* (2013.01); *H02H 7/1216* (2013.01); *H02M 1/32* (2013.01); *H02M 3/3376* (2013.01);
(Continued)

(58) Field of Classification Search
CPC ............ H02M 7/04; H02M 5/42; H02M 1/32; H02M 3/3376; H02M 5/458;
(Continued)

(56) References Cited

U.S. PATENT DOCUMENTS 4,342,013 A * 7/1982 Kallman ................ H02H 9/005
177/185
4,563,720 A * 1/1986 Clark .............................. 361/56
(Continued)

FOREIGN PATENT DOCUMENTS

DE 102007007922 A1 8/2008
EP 1870994 A1 12/2007
(Continued)

OTHER PUBLICATIONS

European Search Report, European Searching Authority, EP Application No. 10186733, Munich, Date of Completion Mar. 3, 2011.
(Continued)

*Primary Examiner* — Zeev V Kitov
(74) *Attorney, Agent, or Firm* — GE Global Patent Operation; Rita D. Vacca

(57) ABSTRACT

A power supply converter unit is disclosed, in particular for an electrostatic precipitator, converting the frequency of alternating input supply (1) to high frequency alternating output (Ua, Ub) by rectifying the alternating input supply (1) in a rectifier (12) to a direct current (Udc), which is converted to alternating-current in a full bridge inverter (13) in a H-bridge circuit with switches (48) controlled by a control unit (23). According to the invention on the input side of the rectifier (12) and/or in the direct current (Udc) section there is provided at least one overvoltage protection circuitry (34, 35, 37-39, 45). Furthermore the invention
(Continued)

discloses a method of operation of such a power supply converter unit as well as uses of such a power supply converter unit.

2 Claims, 4 Drawing Sheets

(51) Int. Cl.
*H02M 1/32* (2007.01)
*H02M 3/337* (2006.01)
*H02M 5/458* (2006.01)
*H02M 1/00* (2006.01)

(52) U.S. Cl.
CPC .... *H02M 5/458* (2013.01); *H02M 2001/0058* (2013.01); *Y02B 70/1491* (2013.01)

(58) Field of Classification Search
CPC ............ H02M 2001/0058; H02H 9/04; H02H 7/1216; Y02B 70/1491
USPC .......................................................... 361/18
See application file for complete search history.

(56) References Cited

U.S. PATENT DOCUMENTS

| | | | | |
|---|---|---|---|---|
| 4,706,177 | A * | 11/1987 | Josephson | H02H 7/1227 363/132 |
| 5,019,952 | A * | 5/1991 | Smolenski | H02M 1/4208 323/222 |
| 5,315,533 | A * | 5/1994 | Stich et al. | 700/298 |
| 5,317,498 | A | 5/1994 | Dhyandchand et al. | |
| 5,388,021 | A * | 2/1995 | Stahl | H02H 9/042 361/104 |
| 5,438,502 | A | 8/1995 | Rozman | |
| 5,621,624 | A * | 4/1997 | Soohoo | 363/8 |
| 5,838,127 | A * | 11/1998 | Young | H02P 6/24 318/119 |
| 5,889,659 | A | 3/1999 | Emmerich | |
| 6,026,006 | A * | 2/2000 | Jiang et al. | 363/132 |
| 6,194,842 | B1 * | 2/2001 | Canova | 315/225 |
| 6,515,437 | B1 * | 2/2003 | Zinkler | H05B 41/245 315/291 |
| 6,724,644 | B2 * | 4/2004 | Loef | H02M 1/4241 363/132 |
| 7,068,016 | B2 * | 6/2006 | Athari | 323/222 |
| 7,417,841 | B2 * | 8/2008 | Hotchkiss et al. | 361/103 |
| 7,944,156 | B2 * | 5/2011 | Quazi | 315/307 |
| 8,040,114 | B2 * | 10/2011 | Saint-Pierre | 323/222 |
| 2001/0006469 | A1 | 7/2001 | Grass | |
| 2006/0170378 | A1 * | 8/2006 | Lyle, Jr. | H05B 41/2828 315/312 |
| 2007/0121354 | A1 | 5/2007 | Jones et al. | |
| 2007/0210734 | A1 * | 9/2007 | Botvinnik | A61L 9/22 318/268 |
| 2009/0129124 | A1 | 5/2009 | Ranstad | |
| 2009/0154034 | A1 | 6/2009 | Tallam | |

FOREIGN PATENT DOCUMENTS

| | | |
|---|---|---|
| JP | 2003-088135 | 3/1920 |
| JP | S56-107793 | 8/1981 |
| JP | 63-245271 | 10/1988 |
| JP | 05103494 A | 4/1993 |
| JP | H08-196077 | 7/1996 |
| JP | 1189297 A | 3/1999 |
| JP | H11-164468 | 6/1999 |
| JP | 2002247859 A | 8/2002 |
| JP | 2004-350493 | 12/2004 |
| JP | 2001-092540 | 4/2006 |
| JP | 2007-189776 | 7/2007 |
| JP | 2009-189241 | 8/2009 |

OTHER PUBLICATIONS

International Search Report & Written Opinion, International Searching Authority, PCT Application No. PCT/EP2011/067061, Date of Completion Nov. 5, 2012.
DE102007007922 English Language Abstact, Bibliographic data: DE102007007922 (A1)—Aug. 28, 2008, SEW Eurodrive GMGH & Co [DE] (SEW-Eurodrive GMBH & CO. KG).
Office action issued from Japanese Patent Office dated Jan. 5, 2016 for JP Application No. 2013-532136.
Final Notification of Reasons for Refusal from the Japanese Patent Office, for JP Appln. No. 2013-532136, dated Mar. 9, 2015.
European Office Action issued in connection with corresponding EP Application No. 11766964.8 on Oct. 12, 2016.
Soeiro et al., "Optimal Design of Resonant Converter for Electrostatic Precipitators", IEEE International Power Electronics Conference, pp. 2294-2301, Aug. 9, 2010.
Canadian Office Action issued in connection with corresponding CA Application No. 2813815 on Nov. 28, 2016.

* cited by examiner b)

c)

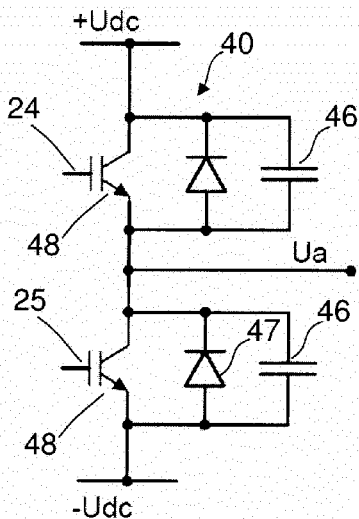
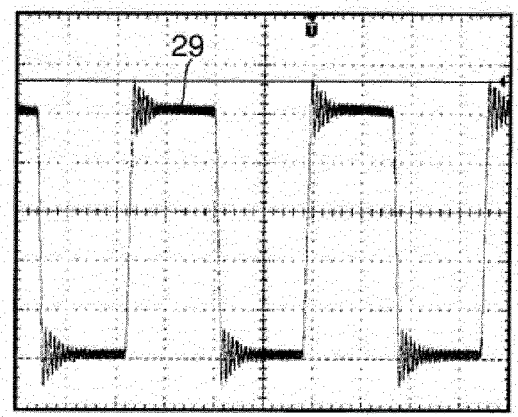
FIG. 3       FIG. 4
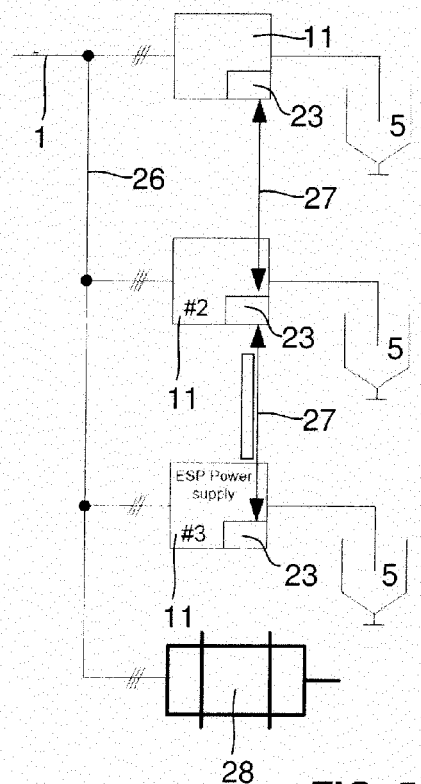
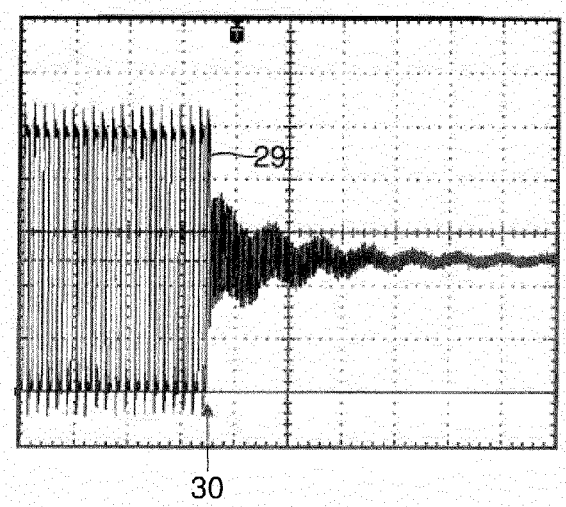
FIG. 5       FIG. 6

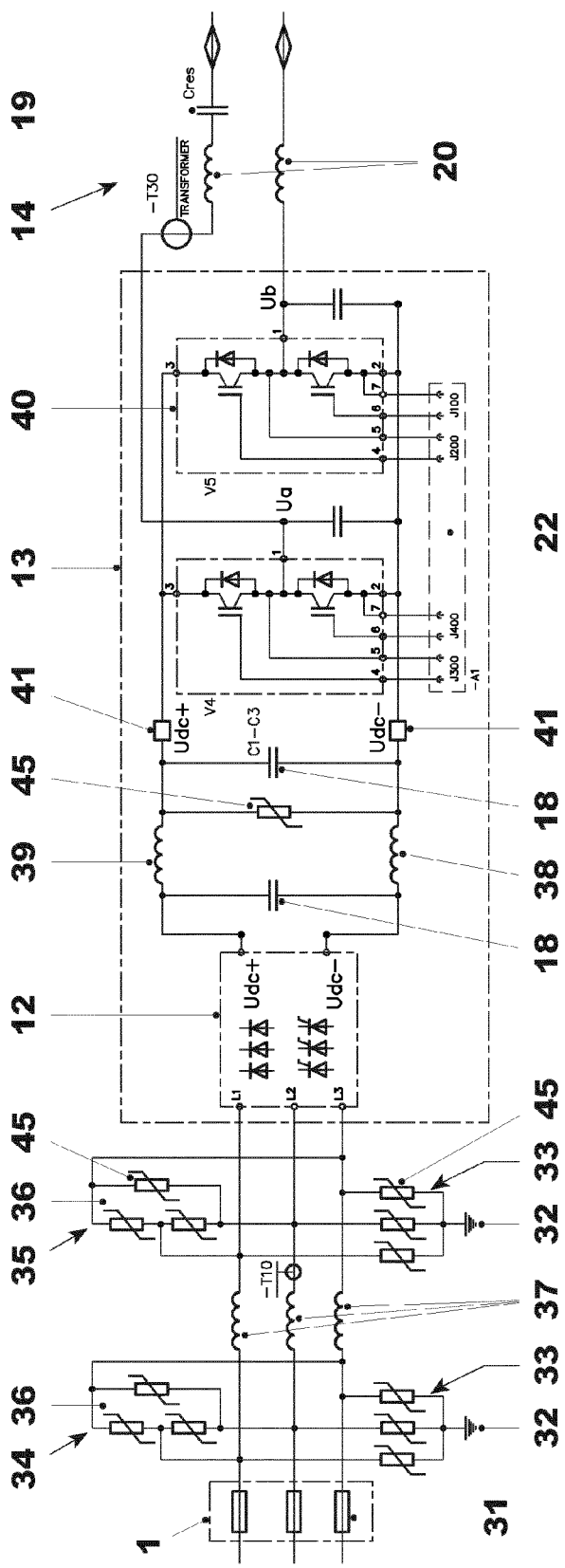
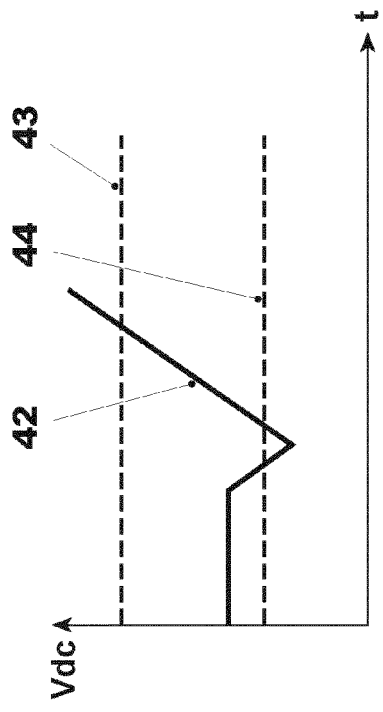
FIG. 7
FIG. 8

METHOD AND DEVICE TO PROTECT AN ESP POWER SUPPLY FROM TRANSIENT OVER-VOLTAGES ON THE POWER GRID

This is a US National Phase application claiming priority to International Application No. PCT/EP2011/067061 having an International Filing Date of Sep. 30, 2011, incorporated herein in its entirety by reference.

TECHNICAL FIELD

The present invention relates to the field of power supplies, for example for the operation of devices such as electrostatic precipitators. It furthermore relates to methods of operation of such power supplies as well as uses of such power supplies.

PRIOR ART

With the increasing concern for environmental pollution, the reduction of particle emissions by using Electrostatic Precipitators (ESPs) is a highly important issue for coal fired power plants. ESPs are highly suitable dust collectors. Their design is robust and they are very reliable. Moreover, they are most efficient. Degrees of separation above 99.9% are not unusual. Since, when compared with fabric filters, their operating costs are low and the risk of damage and stoppage owing to functional disorders is considerably smaller, they are a natural choice in many cases. In an ESP, the polluted gas is conducted between electrodes connected to an ESP power supply. Usually, this is a high-voltage transformer with thyristor control on the primary side and a rectifier bridge on the secondary side. This arrangement is connected to the ordinary AC mains and thus is supplied at a frequency, which is 50 or 60 Hz. The power control is effected by varying the firing delays of the thyristors. The smaller the delay angle, i.e. the longer the conducting period, the more current supplied to the ESP and the higher the voltage between the electrodes of the ESP. Modern ESPs are divided into several bus sections for increasing the collection efficiency. Each of these bus sections has its own power supply (PS), which is controlled individually and has a typical output power range of 10-200 kW and an output voltage range of 30-150 kVDC.

Modern ESP's power supplies are often based on resonant converters in order to utilize the transformer's non-idealities and to have soft switching for a wide operation range. One exemplary power supply for ESP's is known from US 2009/0129124.

Overvoltage protection for converters with line-frequency switched rectifiers is known from the DE 10 2007 007922.

Further, the use of the rate of change of the voltage as an input to the DC link voltage controller is known from the US 2007/0121354.

SUMMARY OF THE INVENTION

An ESP power supply contains all the equipment necessary to support a single ESP bus section with high voltage. The main electronic blocks of the ESP power supply are converter unit, high voltage unit, and controller unit. The converter unit is performing the frequency conversion of the incoming power which is typically based on insulated gate bipolar transistors (IGBT) in a so-called H-bridge. The high voltage unit is a transformer with rectifier. The controller unit adapts the power flow to the bus section according to the actual operational conditions.

In case of a transient overvoltage on the power grid, there is a risk of an overvoltage on the DC link in such a power supply. As a consequence an IGBT failure may occur due to an overvoltage across one transistor of the H-bridge, which is in the blocking state.

The problems associated with this effect are solved by the device and method according to this invention and as claimed in the appended claims.

Specifically, the present invention relates to a power supply converter unit, in particular for an electrostatic precipitator, converting the frequency of alternating input supply to high frequency alternating output by rectifying the alternating input supply in a rectifier to a direct current, which in turn is then converted to alternating-current in a full bridge inverter in a H-bridge circuit with switches controlled by a control unit. Specifically in accordance with the invention, on the input side of the rectifier and/or in the direct current section there is provided at least one overvoltage protection circuitry. The term overvoltage protection circuitry is not intending to mean simple fuses in the input lines but refers to overvoltage protection of the lines with respect to ground and/or among individual phases of the input. According to a first preferred embodiment therefore, the overvoltage protection circuitry comprises at least one voltage limiting circuitry, typically based on varistors such as metal oxide varistors, limiting the maximum voltage between individual phases of the alternating input supply or between the levels of the direct current, respectively.

According to yet another preferred embodiment, the overvoltage protection circuitry comprises at least one further voltage limiting circuitry limiting the maximum voltage between the individual phases of the alternating input supply and ground or between the levels of the direct current and ground.

A further preferred embodiment is characterised in that the overvoltage protection circuitry comprises at least one inductor in each of the phases of the alternating input supply or in the lines of the direct current, respectively.

Preferentially, there is provided at least one voltage limiting circuitry, optionally in combination with at least one further voltage limiting circuitry provided on the input side of the at least one inductor and there is provided at least one voltage limiting circuitry, optionally in combination with at least one further voltage limiting circuitry provided on the output side of the at least one inductor.

A voltage limiting circuitry provided on the output side of the at least one inductor might not be sufficient to protect the rectifier during transient changes. The fast rises in the input voltage are effective without delay on the input side of the at least one inductor and could also damage the inductor. Therefore the voltage limiting circuitry provided on the input side of the at least one inductor is more effective for protection during fast transients.

Due to the typical non-idealities of the voltage limiting circuitry and in order to safely control the maximum rate of change of the voltage/current reaching the switches of the bridge, this particular combination of two voltage limiting circuitries arranged on both sides of the inductor has proven to be highly efficient.

Typically, the switches of the H-bridge are at least four switching elements, preferably at least four IGBT elements controlled by one same control unit.

In order to fully protect the switching elements from overvoltage, there is, according to yet another preferred embodiment, provided at least one element or sensor for the detection of the voltage and/or the current as well as the temporal behaviour thereof (rate of change) in the lines of the direct current section, the output values of which element are used in/operatively linked with the control unit for the control of the switches.

The control unit, when reaching threshold values in the voltage and/or the current as well as the temporal behaviour thereof is adapted to turn the switches to the blocking off-state. Preferentially the turn-off is initiated by the control unit when the detected values are reaching an upper threshold value, or a lower threshold value, or by reaching a rate of change of the value, or by a dynamically calculated threshold value based on fixed upper/lower threshold values and the present rate of change of the value.

In a further embodiment the turn-off is initiated by independent protection logic. This allows a faster response to dangerous changes in the voltage than the use of the voltage in the voltage controller. In particular, the independent protection logic is faster than the voltage control itself. The combination of a voltage control with a protection logic allows operating at higher voltages, thus improving the performance and extending the operating range of the device.

Normally on the alternating input supply there is a three-phase input, optionally protected by fuses in each of the lines.

According to a specifically preferred embodiment, the overvoltage protection circuitry includes varistors, preferably metal oxide varistors, wherein further preferably the at least one voltage limiting circuitry and/or the further voltage limiting circuitry is essentially based exclusively on varistors, preferentially connected in respective delta circuitry.

Even more specifically, preferably the overvoltage protection circuitry comprises at least one voltage limiting circuitry based on varistors limiting the maximum voltage between the individual phases of the three-phase alternating input supply, wherein the overvoltage protection circuitry further comprises at least one further voltage limiting circuitry based on varistors limiting the maximum voltage between the individual phases of the three-phase alternating input supply and ground, wherein the overvoltage protection circuitry further comprises at least one inductor in each of the phases of the three-phase alternating input supply, and wherein there is provided at least one voltage limiting circuitry, in combination with at least one further voltage limiting circuitry provided on the input side of the at least one inductor and there is provided at least one voltage limiting circuitry, in combination with at least one further voltage limiting circuitry provided on the output side of the at least one inductor.

Furthermore the present invention relates to a method for the operation of a power supply converter unit as described above. According to this method, preferably there is provided at least one element or sensor for the detection of the voltage and/or the current and/or the temporal behaviour thereof in the lines of the direct current section, and the measurement values of this element are used in the control unit for the control of the switches.

According to a preferred embodiment of this method the overvoltage protection of the power supply converter unit is effected in that the control unit, upon detecting/receiving threshold values in the measured voltage and/or the current and/or the temporal behaviour thereof, turns all the switches of the H-bridge to the blocking off-state.

Preferably the turn-off is initiated by reaching an upper threshold value, or a lower threshold value, or by reaching a maximum rate of change of the value, or by a dynamically calculated threshold based on fixed upper/lower threshold values and the measured rate of change of the value. In the latter case the target of the control is to make sure that it is absolutely excluded that voltage values/current values reach the switches which harm this constructional element. Correspondingly in the rate of change of the voltage for example is slow, it is safe to turn off the switching elements essentially upon reaching a fixed threshold value. If however the rate of change is high the threshold value needs to be adapted in order to take into account that the system will not instantly react on the turn-off signal, and to take into account that due to this the voltage value seen by the device may still dangerously rise just after the switching of signal. Generally speaking therefore one can say that the higher the rate of change detected, the more conservatively the threshold value is to be set. So the higher the rate of change when getting near the critical values, the lower the threshold value has to be chosen.

One possible control scheme can be given by the calculation of a control function $F(u(t))$ as a function of the present voltage $u(t)$ in the lines in the direct current section (DC link voltage), which function depends on the currently measured voltage value $u(t)$ and a first derivative $u'(t)$ thereof. Optionally also a second derivative $u''(t)$ can be taken into account. Each of the derivatives can be multiplied with constants A and B leading to the following equation:

$$F(u(t))=u(t)+Au'(t)+Bu''(t).$$

The control should preferably not only control depending on the value of $F(u(t))$, but also on $u(t)$, so the currently DC link measured voltage value. In other words taking $U_{max}$ as the maximum allowed value of the voltage in the DC-Link the stop switching signal should be initiated by the control unit when at least one of the following two conditions:

$$F(u(t))<U_{max}$$

$$u(t)<U_{max}$$

fulfilled. The corresponding control scheme may also be further supplemented by a dependence on the current measured in the DC link.

Typically, the maximum rate of change of the value, so the rate of change value which, when exceeded, leads to an automatic turn-off of all the switches, is in the range of 0.1-10 kV/ms, preferably in the range of 0.5-2 kV/ms.

Typically, the upper threshold value is in the range of (800V)-(2000V), preferably in the range of (900 V)-(1200 V). The lower threshold value is typically in the range of (0 V)-(700V), preferably in the range of (350 V)-(550 V).

Furthermore the present invention relates to a use of a power supply as described above, further preferably using the method of operation above, for the operation of an electrostatic precipitator, wherein preferably at least two power supplies are used, each for at least one bus section of the electrostatic precipitator.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

FIG. 3 shows a detail of a bridge leg of the full bridge inverter;

FIG. 4 shows the voltage as a function of time under IGBT switching action, gridlines indicate 10 μs so the pulse period is around 40 μs;

FIG. 5 as an example shows the connectivity of a group of 3 ESP power supplies with an ESP fan motor;

FIG. 6 shows the bridge leg voltage, Ua, when stopping IGBT switching, gridlines indicate 200 μs;

FIG. 7 shows a circuit diagram of a converter unit of an ESP power supply with protection circuitry; and FIG. 8 schematically shows possible control scheme elements as a function of the DC link voltage.

DESCRIPTION OF PREFERRED EMBODIMENTS

Usually an ESP system is divided into several bus sections to improve the particulate collection efficiency. In small systems, only 2 or 3 bus sections are connected in series and in large ones, several bus sections are connected in parallel and in series. Different power supplies with different power ratings often energize the bus sections in order to optimize the collection efficiency of the single bus section.

Figure 1:
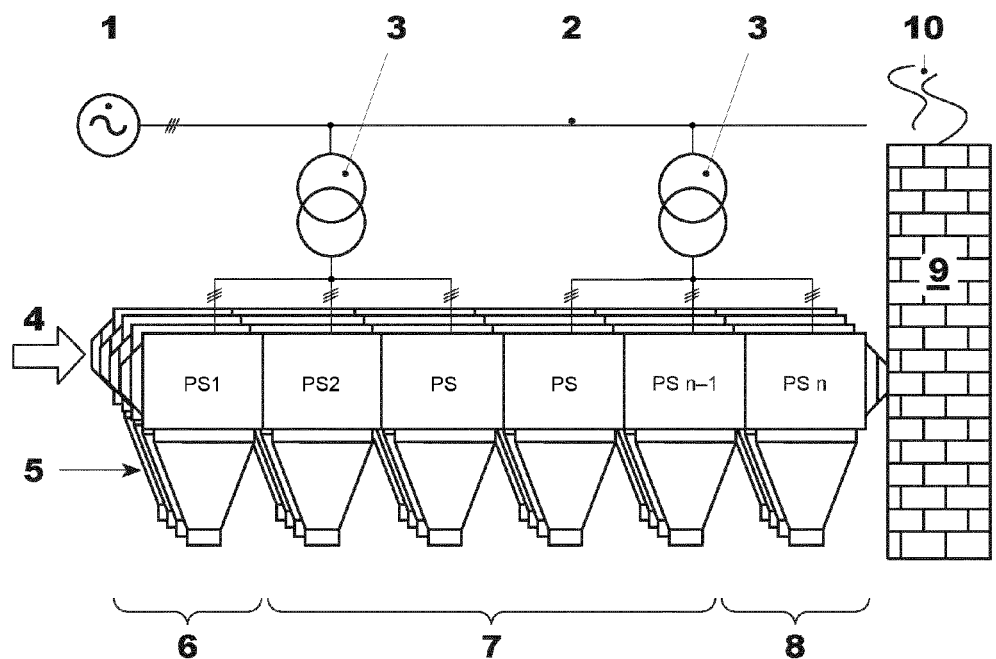
FIG. 1 shows a typical ESP installation scheme, specifically a system with several sequential bus sections driven by 24 power supplies.

FIG. 1 shows a typical ESP installation with several sequential bus sections driven by 24 power supplies. The electrostatic precipitator 5 comprises an inlet side trough which a gas flow 4 loaded with particles, e.g. coal dust, enters the ESP. The ESP has an inlet field 6, followed by middle fields 7 and is terminating by an outlet field 8, the outlet of which is connected to a stack 9 through which the cleaned exhaust gas 10 exits to the environment. So the ESP is mechanically sectionalized in series connected fields and parallel connected cells to utilize the collection efficiency. Each field/cell position is called a bus section. One ESP power supply is feeding a single bus section with high voltage.

Each of the fields 6-8 has two rows of individually powered precipitator systems (four cells and six fields), leading to 24 bus sections, and to this end 24 power supplies (PS) are provided for the energisation of the precipitators. The power supplies are energized via the common feeding 1, which via a low or medium voltage line 2 and distribution transformers 3 connects to the individual power supplies. In other words the totality of the power supplies is connected to a common feeding system 1 and if these power supplies or at least a fraction thereof are operated in pulsed mode the load on the main can be heavily unbalanced.

Figure 2A:
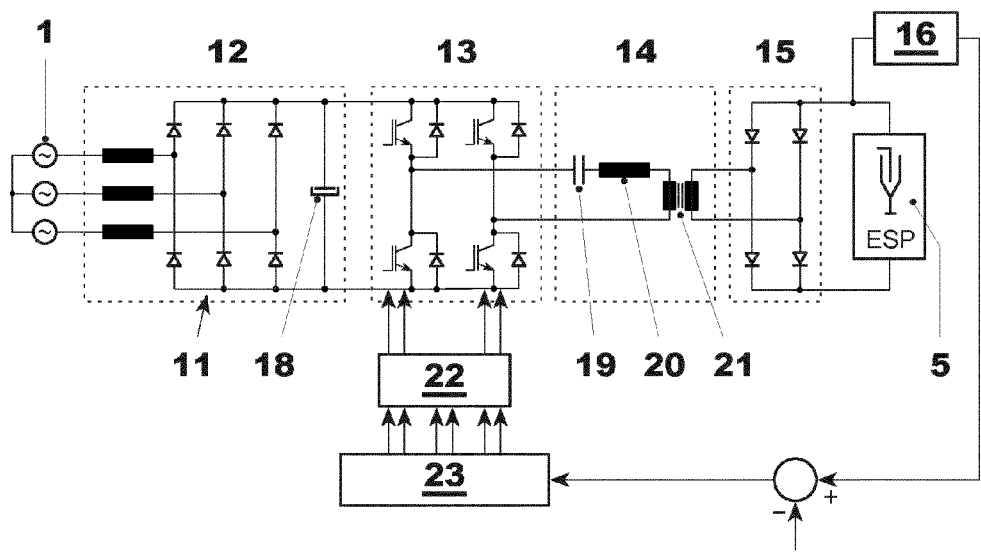
FIG. 2 a) shows a schematic of a single high frequency ESP power supply, b) a schematic of a typical single phase mains frequency ESP power supply, c) a block diagram of a single high frequency ESP power supply.
Figure 2:
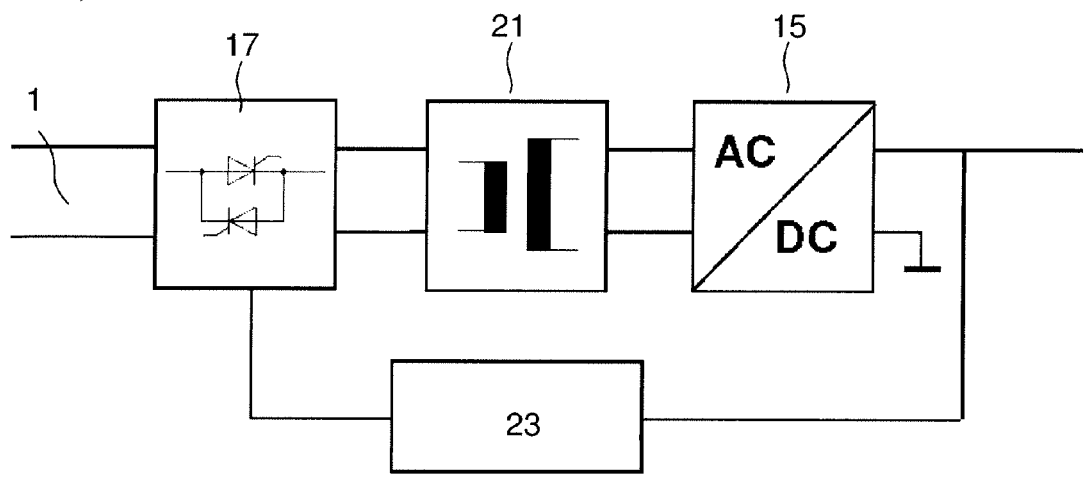
Figure 2:
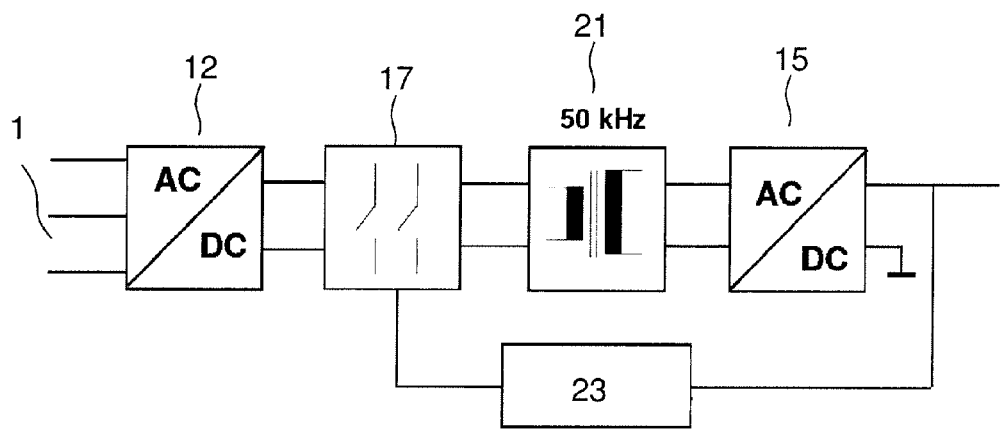

A power supply 11 for powering one of the individual bus sections in a setup according to FIG. 1 is illustrated in FIG. 2 a. On the input side the power supply 11 is connected to the mains 1 and first comprises an input rectifier 12. At the output side of the input rectifier 12 a direct current (DC) is provided and between the levels there is located a DC link capacitor 18. This direct current is then fed trough a full bridge inverter 13 with a number of correspondingly fired transistors. The operation of the full bridge inverter 13 is controlled by drivers 22 in turn controlled by a control unit 23. The alternating current on the output side of the full bridge inverter 13 enters a resonant tank and transformer unit 14, the resonant circuit given by a series arrangement of a capacitor 19 and an inductor 20 followed by a transformer 21. On the output side the unit 14 can be coupled to an output rectifier 15 the output side of which is then coupled to the electrodes of the electrostatic precipitators 5.

For pulsed operation of such a power supply the full bridge inverter is operated in pulsed mode via the control unit 23 and the drivers 22. In order to control the whole system there is provided a current and voltage sensor 16 the output of which is used for controlling the unit 23.

The present invention is not limited to (high frequency) three-phase power supplies as illustrated in FIG. 2a and also further schematically in FIG. 2c, which typically operate at a frequency in the resonant tank in the 20-200 kHz range. Also possible are mains frequency power processing units as illustrated in FIG. 2b, where a single phase mains 1 is switched in unit 17, transformed by a transformer 21 and rectified for the final use at the ESP after the output rectifier 15.

So in the ESP power supply the 3-phase supply is rectified and the DC link voltage (+Udc, −Udc) is applied across the H-bridge 13 (Ua, Ub). The IGBT's 48 of the bridge are controlled in such a way that a variable frequency square-wave voltage is fed to the high voltage unit.

A more detailed description of the converter unit IGBT module switching and its voltage rating as following: FIG. 3 shows a bridge leg 40 of the H-bridge. Each of the gates includes an IGBT 48 in parallel with a capacitor 46 and a diode 47. The bridge leg 40 is operated in such a way that one valve (for example the upper IGBT 24) is in the ON state (i.e. in the conducting state) and the complementary one (for example the lower IGBT 25) is in the OFF state (i.e. in the blocking state).

FIG. 4 shows the resulting voltage Ua as a function of time for a pulse period of about 40 μs. The voltage stress of the IGBT, which is in the ON state is very low (~0V) while the IGBT which is in the OFF state is blocking the full DC link voltage. Typically IGBTs used in this context have a rating of 1200 V, generally typical ratings can be in the range of 600-6500 V, so in case of a transient overvoltage on the grid above this value the IGBT will take harm.

Possible causes for transient overvoltages can be lightning's, connection/disconnection of capacitor banks or short circuits in connected equipments etc. A typical example is illustrated in FIG. 5, illustrating a situation where several ESP power supplies for different bus sections of the electrostatic precipitator are powered by a common distribution line 26. The individual ESP power supplies 11 comprises a control unit 23 which among each other are connected via communications line 27. In such a system there can be a short circuit fault in one of the ESP power supplies or in an additional different load 28 attached to the same mains 1 via the common distribution line 26. Such an additional load can for example be the motor 28 for the fan that is forcing the gas flow through the ESP casing. When the protecting fuses for the fan 28 disconnect the short circuit, a very high voltage transient is induced heavily impacting on the other loads connected to the same distribution line 26, i.e. heavily impacting on the ESP power supplies 11.

If the switching operation of the IGBTs is stopped and both IGBTs 24, 25 in a bridge leg 40 are in the blocking state, the DC link voltage will be evenly shared between the two IGBTs 24, 25. Consequently the blocking capability of the H-bridge 40 is twice the blocking capability of a single IGBT. Hence, the IGBTs may be protected under overvoltage conditions by stopping the switching action. FIG. 6 shows the bridge leg voltage 29, Ua, when the switching action is stopped (indicated by arrow 30). From the figure it can be seen that the voltage across one IGBT settles down to 50% of the DC link voltage within 200-400 μs.

The proposed solution in addition to this control scheme monitoring the voltage and its slope on the DC levels and turning the IGBTs off in order to protect them, may contain a protection circuitry, which limits the rate of rise of the DC link voltage as a result of an overvoltage transient, and a real time analysis of the dynamics of the DC link voltage. When the analysis yields a dangerous situation, an upcoming risk for an IGBT failure (overvoltage), the switching of the IGBTs is stopped. The switching operation restarts automatically when the conditions on the DC link are back to normal.

A correspondingly structured circuit diagram of an ESP power supply is illustrated in FIG. 7.

The protection circuitry contains two overvoltage protection devices 34 and 35 and one inductor 37. The overvoltage protection devices 34 and 35 are set of varistors 45 (metal oxide varistors), one group 33 protecting the level of each line with respect to ground 32 and one group 36 protecting the voltage difference between the lines. The overvoltage protection devices 34 and 35 are positioned on both sides of the inductor 37.

Indeed due to non-idealities of the components of the over-voltage protection devices it cannot be excluded that one single overvoltage protection device will not be sufficient. In other words the first overvoltage protection device 34 may not exclude that on a short timescale a high-voltage value will reach the inductor 37. In order to such a high-voltage value will be damped further the additional protection device 35 is provided. In the combination of the elements 34, 35 and 37 the rate of rise of the DC link voltage is limited. The inductor 37 is connected in series with the 3-phase supply 1 (in series with additional fuses 31). In the example of an implementation of this type as shown in FIG. 2, an inductor 37 and a DC inductor 38 (negative DC level) and 39 (positive DC level) has been incorporated in the design. Overvoltage protection devices 34 and 35 are added on both sides of the inductors 37. This protection circuitry 34 and 35 is limiting the voltage across the inductor 37 and the DC inductor 38/39 and thereby limiting the slope of the inrush current to the DC link of the converter unit. A limited slope rate is positive when detecting un-normal DC link voltages and will help saving power electronic components from failure.

The controller 23 continuously performs a dynamic analysis of the DC link voltage as measured with sensors 41 and rapidly decides upon stopping the switching action of the IGBT modules when the DC link voltage across one IGBT leg threatens to damage the IGBT's.

An example of the analysis of the DC link voltage dynamics if as follows (see FIG. 8):

1. The DC link voltage across one IGBT leg has reached a level higher than the limit "DC link voltage high" 43; if this condition is met, all IGBTs are turned off by the control 23.
2. The DC link voltage across one IGBT leg has reached a level lower than the limit "DC link voltage low" 44; if this condition is met, all IGBTs are turned off by the control 23.
3. The slope of the DC link voltage across one IGBT leg is increasing/decreasing too fast (Volt/second); if this condition is met, all IGBTs are turned off by the control 23. Typically voltage changes in the range of kilovolt per millisecond are considered too fast.

The levels 43 and 44 can be set as non-dynamic fixed values. However advantageously a combination control taking into account slope as well as maximum values is implemented. In other words maximum level 43 as well as minimum level 44 can be determined dynamically as a function of the slope. If for example the DC link voltage is increasing/decreasing rapidly, a lower maximum level 43 and a higher minimum level 44 should be chosen to take into account that the system will not react instantly. So depending on the speed of approaching the level values the latter will have to be adapted in order to make sure that the rating of the IGBTs will not be exceeded due to reaction time effects. The controller 23 continuously performs an analysis of the DC link voltage dynamics. The protection circuitry 34, 35, 37 added to the design limits the slope of the inrush current to the converter and thereby the rate of rise of the DC link voltage in case of an overvoltage transient on the power grid. This leads to a higher reliability of the ESP power supply and allows the automatic restart after an overvoltage transient.

The inductor 37 can also be incorporated in the converter unit design with different configurations.

Examples of different configurations:
1. Only on the AC side of the input rectifier (only elements 37 as illustrated in FIG. 7);
2. Only on the DC side of the input rectifier (only elements 38/39 as illustrated in FIG. 7);
3. On both sides of the input rectifier (as illustrated in FIG. 7). Important parts are the overvoltage protection devices on both sides of the inductance.

The analysis of the DC link voltage dynamics can be performed in different ways. What is of importance is that the IGBT switching is stopped with enough time margin to the dangerous situation in order to prevent failure.

The proposed scheme may also be used more generally on any converter equipment containing a voltage stiff IGBT bridge having a DC link monitored by a control system.

| LIST OF REFERENCE SIGNS | |
|---|---|
| 1 | mains, common feeding |
| 2 | low or medium voltage level line |
| 3 | distribution transformer |
| 4 | gas flow loaded with particles, e.g. coal dust |
| 5 | electrostatic precipitator |
| 6 | inlet field |
| 7 | middle fields |
| 8 | outlet field |
| 9 | stack |
| 10 | cleaned exhaust gas |
| 11 | power supply |
| 12 | input rectifier |
| 13 | full bridge inverter, H-bridge |
| 14 | resonant tank and transformer |
| 15 | output rectifier |
| 16 | current and/or voltage sensor |
| 17 | thyristor blocks |
| 18 | DC link capacitor |
| 19 | capacitor in series |
| 20 | inductor in series |
| 21 | transformer |
| 22 | drivers |
| 23 | control unit |
| 24 | gate 1 |
| 25 | gate 2 |
| 26 | distribution line |
| 27 | communication interface |
| 28 | additional load, fan motor |
| 29 | bridge leg voltage as a function of time |
| 30 | stopping IGBT switching, both IGBT turned off |
| 31 | fuses |
| 32 | ground |

-continued

| LIST OF REFERENCE SIGNS | |
|---|---|
| 33 | varistors for protection with respect to ground |
| 34 | protection circuitry on the input side of the inductor |
| 35 | protection circuitry on the output side of the inductor |
| 36 | varistors for protection between three-phase levels |
| 37 | inductor |
| 38 | DC inductor on negative level |
| 39 | DC inductor on positive level |
| 40 | half bridge of inverter |
| 41 | sensor for DC level voltage/current |
| 42 | slope of DC link voltage |
| 43 | DC link upper threshold |
| 44 | DC link lower threshold |
| 45 | metal oxide varistor, MOV |
| 46 | capacitor |
| 47 | diodes |
| 48 | switching element, IGBT |
| Ua, Ub | bridge leg voltage |
| +Udc | positive DC link voltage |
| −Udc | negative DC link voltage |
| t | time |

The invention claimed is:

1. A method for operation of a power supply converter unit for an electrostatic precipitator, comprising:
rectifying an alternating input supply to a direct current by using a rectifier and a link capacitor;
converting the direct current from the rectifier and link capacitor to an alternating current using a full bridge inverter in a H-bridge circuit with switches controllable by a control unit for alternating current entry into a resonant tank and transformer unit coupled to an output rectifier with an output side of the output rectifier coupled to electrodes of the electrostatic precipitator;
limiting a rate of rise of the direct current voltage using an overvoltage protection circuitry, comprising:
at least one inductor arranged in each phase of the alternating input supply or in each line of the direct current; and
at least two voltage limiting circuitries, with at least one of the at least two voltage limiting circuitries arranged on an input side of the at least one inductor and at least one of the at least two voltage limiting circuitries arranged on an output side of the at least one inductor, wherein the at least two voltage limiting circuitries comprise:
at least one voltage limiting circuitry limiting a maximum voltage between individual phases of the alternating input supply or between individual lines of the direct current; and
at least one further voltage limiting circuitry limiting a maximum voltage between the individual phases of the alternating input supply and a ground, or between the individual lines of the direct current and a ground;
measuring in real time the direct current voltage and/or current using a current and/or voltage sensor to obtain current and/or voltage measurements to detect overvoltage conditions; and
stopping a switching operation of insulated gate bipolar transistors in the H-bridge circuit by turning the insulated gate bipolar transistors switches of the H-bridge circuit to a blocking off-state using the control unit based on setting a lower threshold value higher than a calculated lower threshold value and setting an upper threshold value lower than a calculated upper threshold value, each calculated lower threshold value and calculated upper threshold value calculated based on a speed of a rate of change of the current and/or voltage sensor obtained current and/or voltage measurements to double blocking capability of the H-bridge to protect the insulated gate bipolar transistors under the detected overvoltage conditions.

2. The method according to claim 1, wherein turning the insulated gate bipolar transistors of the H-bridge circuit to a blocking off-state using the control unit is based on the current and/or voltage sensor obtained current and/or voltage measurements reaching the upper threshold value, or by reaching the lower threshold value, or by reaching a rate of change value indicating a risk for insulated gate bipolar transistors overvoltage failure.

* * * * *